United States Patent [19]

Scott

[11] 4,060,715

[45] Nov. 29, 1977

[54] LINEARIZED BRIDGE CIRCUITRY

[75] Inventor: Larkin B. Scott, Fort Worth, Tex.

[73] Assignee: The Perkin-Elmer Corporation, Norwalk, Conn.

[21] Appl. No.: 705,993

[22] Filed: July 16, 1976

[51] Int. Cl.² .......................... G01K 7/24; G06G 7/16
[52] U.S. Cl. .............................. 364/557; 73/362 AR; 364/863
[58] Field of Search ................. 235/151.31, 179, 196; 73/362 AR; 351/151.34

[56] References Cited

U.S. PATENT DOCUMENTS

| 3,379,973 | 4/1968 | Walton | 73/362 AR X |
| 3,613,454 | 10/1971 | McFadin | 73/362 AR |
| 3,624,378 | 11/1971 | Brunkhorst | 235/196 |
| 3,688,581 | 9/1972 | Quernec | 73/362 AR |
| 3,754,442 | 8/1973 | Arnett | 73/362 AR |
| 3,861,214 | 1/1975 | Siyahi | 73/362 AR |
| 3,880,006 | 4/1975 | Poduje | 73/362 AR |
| 3,906,391 | 9/1975 | Murdock | 73/362 AR X |
| 3,924,470 | 12/1975 | Sander | 73/362 AR |
| 3,939,459 | 2/1976 | Hoopes | 73/362 AR X |
| 4,000,454 | 12/1976 | Braki | 73/362 AR X |

Primary Examiner—Edward J. Wise
Attorney, Agent, or Firm—S. A. Giarratana; F. L. Masselle; E. T. Grimes

[57] ABSTRACT

Where the unknown leg of a bridge is a sensor which presents a resistance that relates to a parameter by a second order polynomial, a negative feedback circuit from the conventional null measurement terminals to a voltage divided point in the balance leg thereof is included to provide a substantially linear relationship between the parameter of the sensor and a ratio including two voltage levels from the feedback circuit. A circuit means for continuously monitoring this ratio of voltages with a counter in recurring cycles for digital display is incorporated with the linearized bridge circuit of this invention in a particular embodiment thereof.

9 Claims, 5 Drawing Figures

LINEARIZED BRIDGE CIRCUITRY

BACKGROUND OF THE INVENTION

The present invention relates to a linearized bridge circuit for a sensor which presents a resistance that relates to a parameter by a second order polynomial. Linearized bridge circuits are known in the art for such sensors. However, all such circuits that operate in a similar manner include a balance leg having a manually variable resistor parallel-connected in some portion thereof.

SUMMARY OF THE INVENTION

It is the object of this invention to provide a linearized bridge circuit for a sensor which presents a resistance that relates to a parameter by a second order polynomial with a feedback circuit which does not require a null manual adjustment.

It is a further object of this invention to provide a circuit means for continuously monitoring a ratio including voltage levels from the feedback circuit with a counter in recurring cycles for digital display.

These objects are accomplished according to the present invention by connecting the null measurement terminals of the bridge circuit across the differential inputs of an operational amplifier from which the output is fed back through a fixed resistor to a voltage divided point in the balance leg of the bridge. The substantially linear relationship between the parameter of the sensor and a ratio including two voltages from the feedback circuit that results is monitored for digital display in a particular embodiment with a counter which is enabled during recurring cycles for the time required to integrate from one voltage level in the ratio to a constant related with that voltage level at a rate determined by the differential existing between the voltage levels in the ratio.

BRIEF DESCRIPTION OF THE DRAWINGS

The manner in which these and other objects of the present invention are achieved will be best understood by reference to the following description, the appended claims, and the attached drawings wherein:

DESCRIPTION OF THE PREFERRED EMBODIMENT

Figure 1:
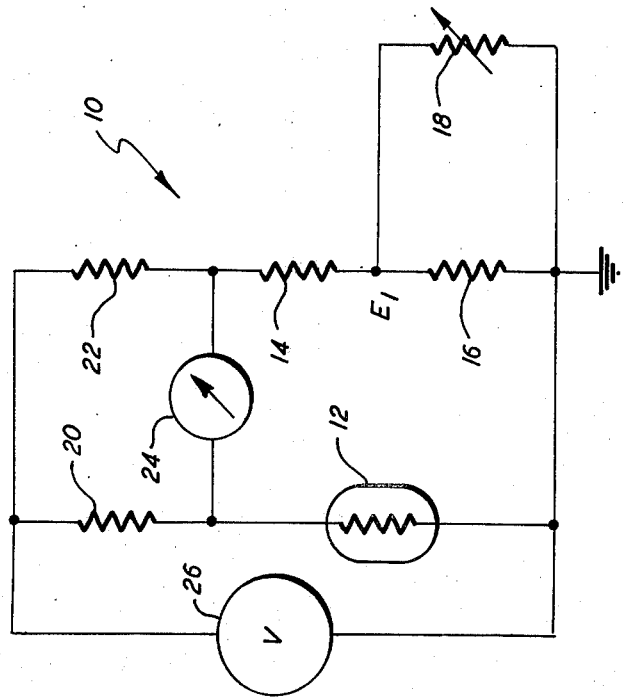
FIG. 1 is a schematic of a prior art manually adjusted linearized bridge circuit.

Turning now to the drawings, the schematic of FIG. 1 illustrates a prior art linearized bridge circuit 10 for a sensor 12 which presents a resistance that relates to a parameter by a second order polynomial. In this circuit, the sensor 12 is disposed as the unknown leg of the bridge circuit 10, while the balance leg thereof includes fixed resistors 14 and 16 which are series connected with the voltage level therebetween being designated as $E_1$ and a variable resistor 18 is parallel connected across the fixed resistor 16. Fixed resistors 20 and 22 are individually connected in the remaining legs of the bridge circuit 10, while a null meter 24 and a voltage source 26 are conventionally connected thereacross.

Figure 2:
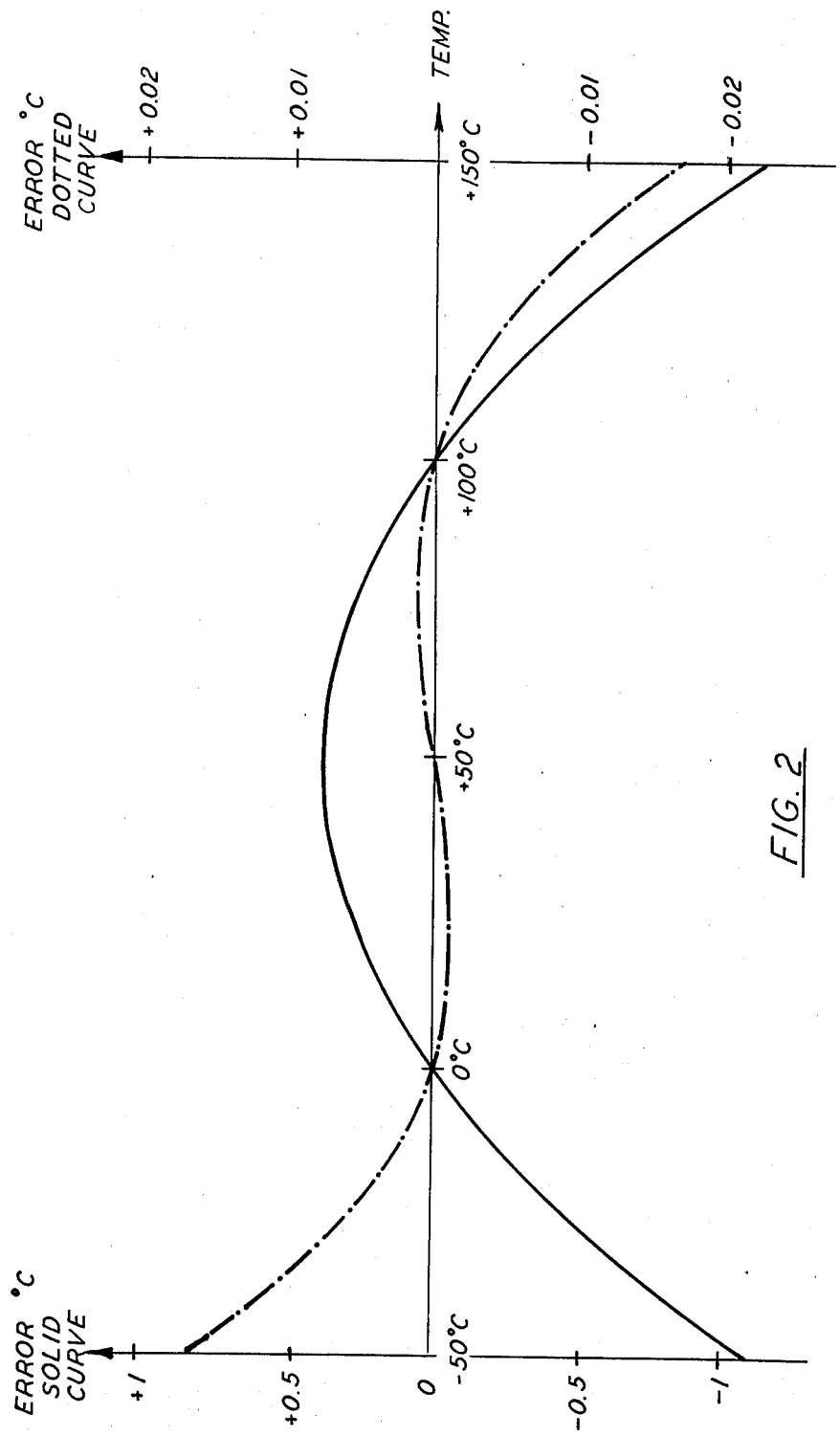
FIG. 2 is a plot of curves which illustrate the accuracy obtained with the linearized bridge circuit of FIG. 1.

For purposes of discussion only, a platinum element presenting a resistance that relates to temperature by a second order polynomial is assumed to be the sensor 12 so that the general equation thereof is as follows:

$$R_T = R_0(1 + A \cdot T - B \cdot T^2) \quad \text{[Equation 1]}$$

wherein;
$R_T$ = resistance at temperature T
$R_0$ = resistance at temperature zero
$A = 0.390784076 \times 10^{-2}$
$B = 0.5784084 \times 10^{-6}$ and, as is well known in the art, a very close approximation of this equation is the following:

$$R_T = R_o + a(b \cdot T/b + T) \quad \text{[Equation 2]}$$

wherein;
$a = A \cdot R_o$
$b = a/R_o B = A/B$ which is more readily adaptable to bridge circuitry because the term within the parenthesis has the form associated with two resistors connected in parallel. Furthermore, through algebraic manipulation, Equation 2 may be written as follows:

$$R_T = R_o + [(a \cdot b) \cdot (a \cdot T)/(a \cdot b) + (a \cdot T)] \quad \text{[Equation 3]}$$

which states that the resistance of the sensor 12 will be simulated in the balance leg of the bridge circuit 10 by a resistor $R_o$ in series with the parallel combination of $a \cdot b$ ohms and $a \cdot T$ ohms. Therefore, by setting fixed resistor 14 equal to $R_o$, resistor 16 equal to $a \cdot b$ and variable resistor 18 equal to $a \cdot T$ for the temperature range to be encountered, a substantially linear relationship will exist between the temperature of the sensor 12 and the resistance of the variable resistor 18 whenever the null meter 24 is balanced. Of course, the size of fixed resistor 20 is determined by the level of current which is to be drawn by the sensor 12 from the voltage source 26 and where the balance leg directly simulates the sensor 12, the size of fixed resistor 22 is the same as that of resistor 20. For particular temperature monitoring applications, however, the resistors 14, 16, 18 and 22 may be multiplied by a common factor to derive a direct proportionality between the temperature of the sensor 12 and the resistance of variable resistor 18. This common factor is $1/a$ for the FIG. 1 circuitry when 100 ohms of the variable resistor 18 is to equal 100° C at the sensor 12. The solid curve in FIG. 2 illustrates the accuracy to which a conventional linear wheatstone bridge will monitor the temperature between −50° C and +150° C if the sensor is assumed to be linear. The values of constants "a" and "b" for the linearized curve can, however, be manipulated in opposite directions in the circuit of FIG. 1 to reduce the magnitude of error to zero at 0,50 and 100° C as shown by the dotted curve in FIG. 2, a great improvement over the simple wheatstone bridge.

Figure 3:
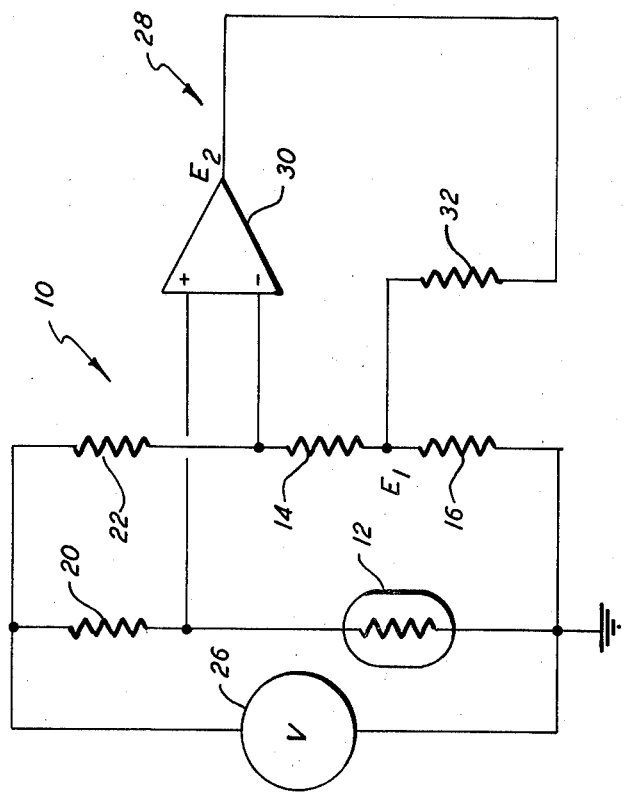
FIG. 3 is a schematic for the linearized bridge circuit of this invention.

Although the prior art linearized bridge circuit shown in FIG. 1 is excellent for simple applications where it is convenient to manually adjust the variable resistor 18, in automated analytical instruments such manual adjustment must be avoided. The linearized bridge circuit of this invention is directed to avoiding the use of variable resistor 18 in the FIG. 1 linearized bridge circuit 10 and a schematic thereof is shown in FIG. 3 where a feedback network 28 is substituted for the null meter 24 and variable resistor 18 but all other aspects of the FIG. 1 bridge circuit 10 remain unchanged. The feedback network 28 includes an operational amplifier 30 having the conventional null measurement terminals of the bridge circuit 10 connected across the differential inputs thereof and the output $E_2$ therefrom connected through a fixed resistor 32 to $E_1$ at the intersection between the fixed resistors 14 and 16 within the balance leg of the bridge circuit.

Due to the feedback and high gain of operational amplifier 30 in FIG. 3, the current through resistor 32 will always be sufficient to drive the voltage level at the inverting input of operational amplifier 30 to a level substantially identical to that of the non-inverting input, so that the bridge circuit 10 is continuously balanced with substantially zero voltage differential existing across the null measurement terminals thereof. Of course, the FIG. 1 bridge circuit 10 is brought to balance by adjustment of the current which passes through variable resistor 18 and, therefore, this current must be substantially equal to the current that passes through resistor 32 when the FIG. 3 bridge circuit 10 is balanced if identical resistors are connected in bridge circuit legs of both FIGS. 1 and 3. Equating Ohm's law expressions for these substantially equal currents, the following expression is derived:

$$E_1/R_{18} = (E_1 - E_2)/R_{32} \qquad \text{[Equation 4]}$$

and therefore:

$$R_{18} = R_{32}(E_1/E_1 - E_2) \qquad \text{[Equation 5]}$$

so that a constant $R_{32}$ multiplied by a ratio including two voltage levels from the feedback circuit is substantially linear with the temperature of the sensor 12 in the circuitry of FIG. 1.

Figure 4:
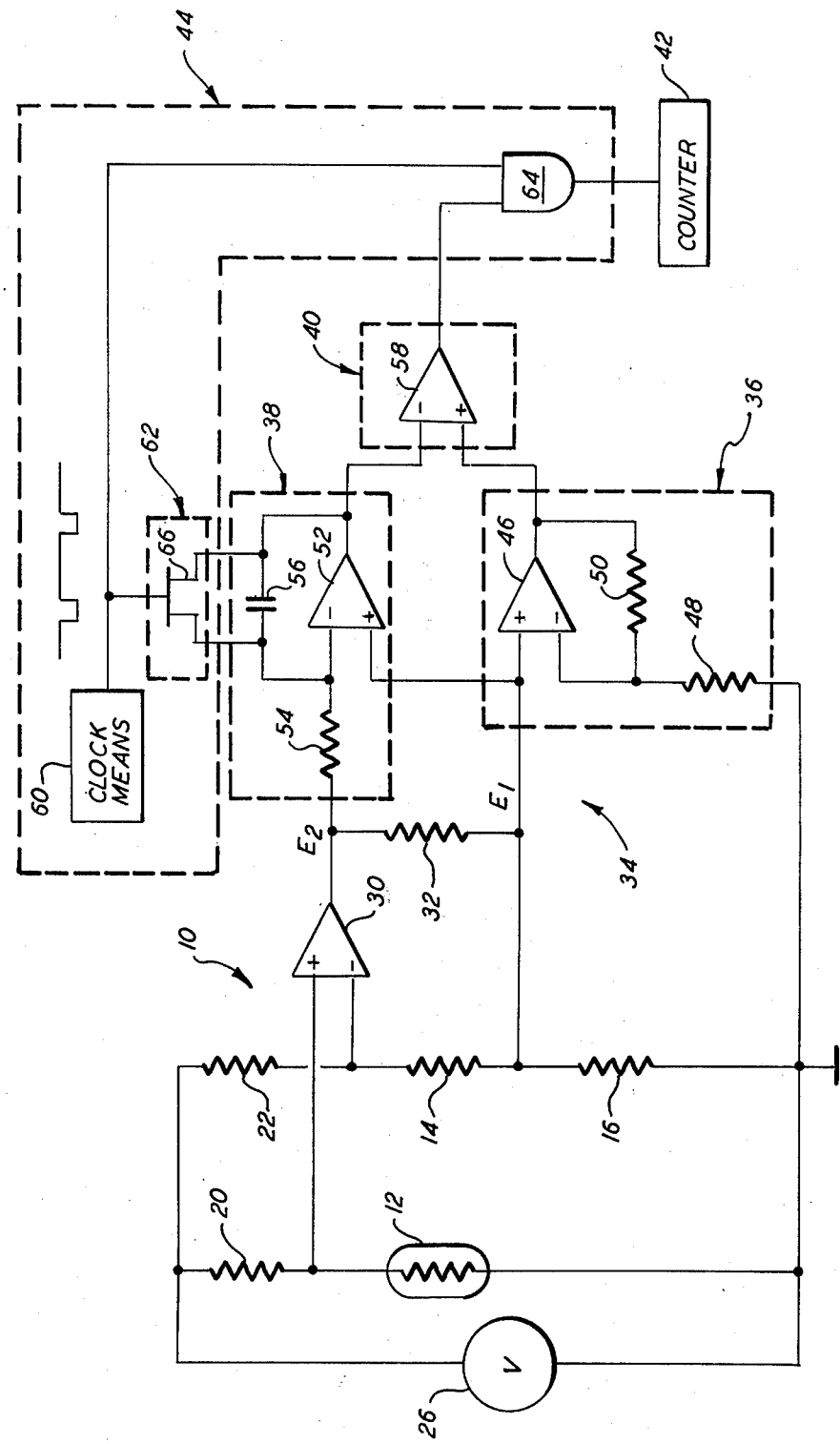
FIG. 4 is a schematic of a circuit means for continuously monitoring the voltage ratio from the linearized bridge circuit of FIG. 3 with a counter in recurring cycles.

Although many circuit arrangements would be capable of reading out the temperature from the voltage ratio multiplied by the constant in the FIG. 3 circuitry, one particularly appropriate circuit means 34 for continuously monitoring this readout in recurring cycles for digital display is illustrated in FIG. 4 where the elements in the linearized bridge circuit of this invention are identified by the same numerals as those used in FIG. 3. This continuously monitoring circuit means 34 includes a means 36 for multiplying the voltage level $E_1$ existing between resistors 14 and 16 by a constant and a means 38 for integrating the output $E_2$ of operational amplifier 30 relative to this voltage level $R_1$. The outputs from the multiplying means 36 and the integrating means 38 are separately connected to the individual inputs of a means 40 for differentially comparing these output levels. Output from this comparator means 40 is connected to a counter 42 through a logic means 44 for enabling the counter during continuously recurring cycles for the interval required to integrate from voltage level $E_1$ to the output level of the multiplying means 36 at a rate determined by the differential that exists between the voltage levels $E_1$ and $E_2$.

As a matter of convenience only, specific circuit arrangements are shown in FIG. 4 for the multiplying means 36, the integrating means 38, the comparator means 40, and the logic means 44. The multiplying means 36 includes an operational amplifier 46 having the noninverting input thereof connected to voltage level $E_1$, while the inverting input thereof is connected to ground through a resistor 48 and to a feedback resistor 50. The integrating means 38 includes an operational amplifier 52 having the noninverting input thereof connected to voltage level $E_1$ while the inverting input thereof is connected to voltage level $E_2$ through a resistor 54 and to a feedback capacitor 56. The comparator means 40 includes an operational amplifier 58 having the output therefrom connected to the logic means 44 and having the noninverting input thereof connected to the output from the multiplying means 36 while the inverting input thereof is connected to the output from the integrating means 38. The logic means 44 includes a clock means for generating continuous pulses at the desired frequency of the recurring monitoring cycles, a reset means 62 for starting the integrating means 38, and an AND gate 64. Of course, the reset means 62 may be any switch connected to short out the feedback capacitor 56 in the integrating means 38, such as a field effect transistor (FET) 66. Output from the clock means 60 is connected to one input of the AND gate 64 and to control the reset means 62. The other input of AND gate 64 is connected to the output from the operational amplifier 58 in the comparator means 40, while the output therefrom is connected to enabled the counter 42.

Figure 5:
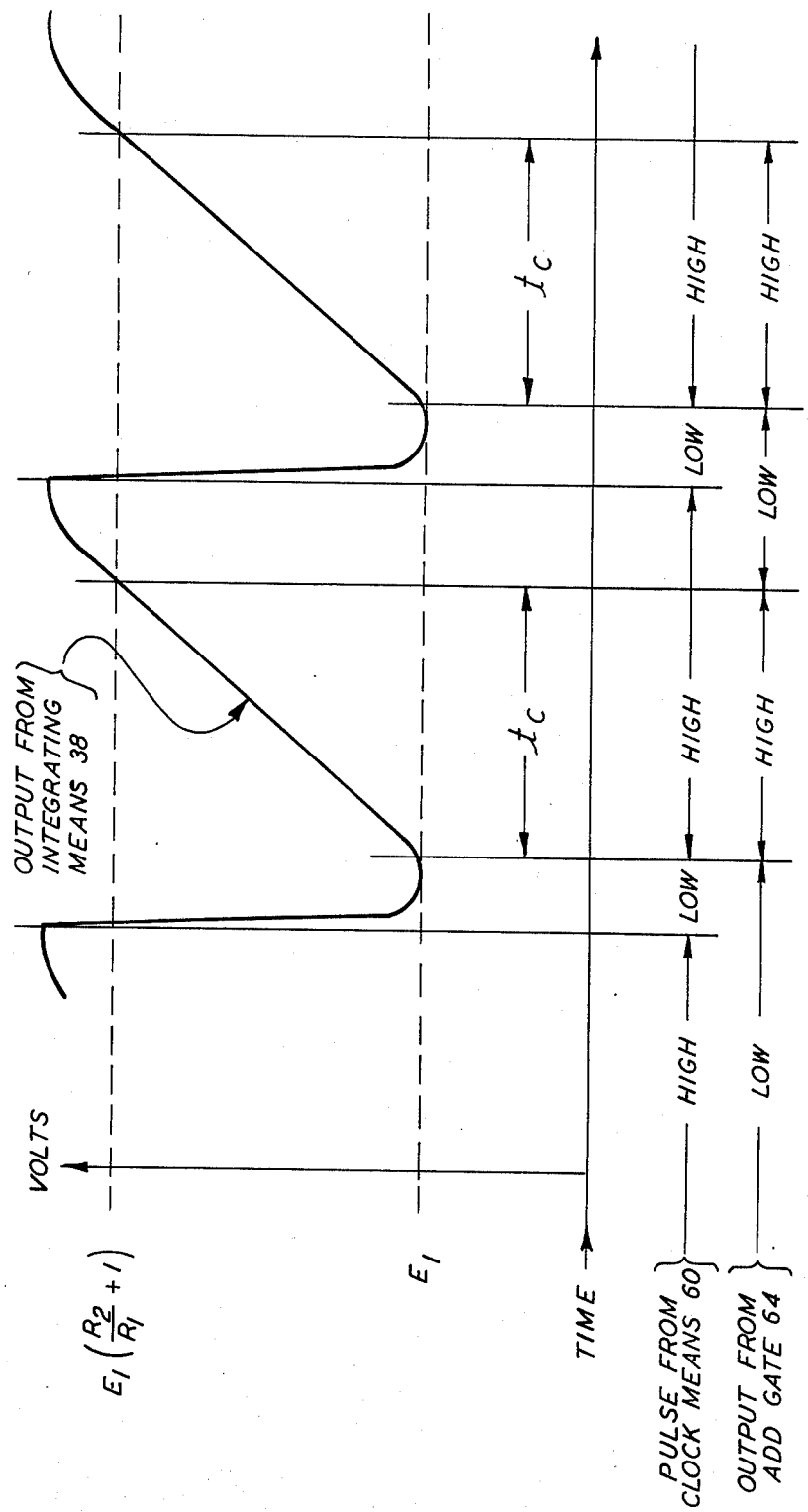
FIG. 5 is the timing diagram for the continuously monitoring circuit means of FIG. 4.

The continuously monitoring circuit means 34 operates in recurring cycles as is shown in FIG. 5. Each cycle starts when the pulse output from the clock means 60 goes low to establish the voltage level $E_1$ at the output of the integrating means 38. Then the pulse output from the clock means 60 goes high to start the integrating means 38 so that output therefrom then changes at a rate proportional to the differential that exists between the voltage levels $E_1$ and $E_2$. Output from the multiplying means 36 is continuously proportional to the voltage level $E_1 (R_{50}/R_{48} + 1)$ and therefore, output from the comparator means 40 is high along with the output from the clock means 60 at the start of the integrating means 38 so that output from the AND gate 64 is also high to enable the counter 42. Thereafter, output from the integrating means 38 increases from the initial voltage level $E_1$ toward the output voltage level of the multiplying means 36 and when this latter voltage level is reached, output from the comparator means 40 becomes low which causes output from the AND gate 64 to go low and thereby disable the counter 42. Assuming that the rate of the integrating means 38 in proportion to the differential between the voltage levels $E_1$ and $E_2$ is constant, the cycle time $t_c$ over which the counter 42 is enabled during each monitoring cycle is directly proportional to the operating interval of the integrating means 38. Of course, this operating interval starts with the output from the integrating means 38 at $E_1$ and ceases when this output reaches the output level of the multiplying means 36, so that $t_c$ can be found as follows:

$$(E_1 - E_2/R_{54}C_{56}) \cdot t_c = E_1(R_{50}/R_{48} + 1) - E_1 \qquad \text{[Equation 6]}$$

and therefore:

$$t_c = (R_{50}R_{54}C_{56}/R_{48})(E_1/E_1 - E_2) \qquad \text{[Equation 7]}$$

which shows the time $t_c$ to be proportional to the ratio of voltages discussed previously, so that $t_c$ must also be proportional to the temperature of the sensor 10. Those skilled in the art will realize without further explanation that $t_c$ of the counter 42 may be converted to a digital readout using any one of the several conventionally known methods.

Certainly those skilled in the art will understand that the present disclosure has been made by way of example and that numerous changes in the details of construction and the combination or arrangement of parts may be resorted to without departing from the true spirit and the scope of this invention. Therefore, the present disclosure should be construed as illustrative rather than limiting.

What I claim is:

1. In a linearized bridge circuit of the type wherein a sensor presenting a resistance related to a parameter by a second order polynomial is disposed in the unknown leg and a voltage divider is disposed in the balance leg, the improvement comprising:

circuit means for continuously balancing the bridge circuit with feedback from across the conventional null measurement terminals thereof to a voltage divided point in the balance leg thereof, the voltage at said point divided by the current level of said feedback having substantially a linear relationship to the parameter of the sensor.

2. The combination of claim 1 wherein said circuit means includes an operational amplifier with the differential inputs thereof connected across the null measurement terminals and a fixed resistor interconnecting output therefrom to the voltage divided point, a ratio determined by the voltage levels at both terminals of said fixed resistor having substantially a linear relationship to the parameter of the sensor.

3. The combination of claim 2 wherein the sensor is a platinum element which presents a resistance relating to the temperature thereof.

4. The combination of claim 2 and further including a circuit means for continuously monitoring said ratio determined by the voltage levels in recurring cycles.

5. The combination of claim 4 wherein said continuously monitoring circuit means includes:

means for integrating the output from said operational amplifier relative to the voltage division level in the balance leg;

means for multiplying the voltage division level in the balance leg by a constant;

means for differentially comparing the outputs from said integrating means and said multiplying means;

a counter; and a logic means connected to said integrating means and said comparator means for enabling said counter during the interval required for output from said integrating means to reach the output level from said multiplying means in continuously recurring cycles.

6. The combination of claim 5 wherein said logic means includes:

an AND gate having one input thereof connected to the output from said comparator means;

reset means for starting said integrating means; and clock means for generating continuous pulses having the frequency of the recurring cycles, output from said clock means being connected to control said reset means and to the other input of said AND gate.

7. The combination of claim 6 wherein said reset means is an FET switch.

8. The combination of claim 5 wherein said integrating means includes a second operational amplifier having the noninverting input thereof connected to the voltage divided level in the balance leg while the inverting input thereof is connected to a feedback capacitor and to output from said first operational amplifier in the bridge circuit through a fixed resistor; wherein said multiplying means includes a third operational amplifier having the noninverting input thereof connected to the voltage divided level in the balance leg while inverting input is connected to a feedback resistor and to ground through a fixed resistor; wherein said comparator means includes a fourth operational amplifier having the inverting input thereof connected to output from said second operational amplifier and the noninverting input thereof connected to output from said third operational amplifier; and wherein said logic means includes an AND gate having one input thereof connected to output from said fourth operational amplifier, an FET swtich shunt connected across said feedback capacitor of said second operational amplifier, and clock means for generating continuous pulses having the frequency of the recurring cycles, output from said clock means being connected to the other input of said AND gate and to control said FET switch.

9. The combination of claim 8 wherein the sensor is a platinum element which presents a resistance relating to the temperature thereof.

* * * * *

UNITED STATES PATENT AND TRADEMARK OFFICE
CERTIFICATE OF CORRECTION

PATENT NO. : 4,060,715

DATED : November 29, 1977

INVENTOR(S) : Larkin B. Scott

It is certified that error appears in the above—identified patent and that said Letters Patent are hereby corrected as shown below:

Column 3, line 38, rewrite equation 5 to read -- $R_{18} = R_{32} [E_1/(E_1 - E_2)]$ --

Column 3, line 56, change "$R_1$." to --$E_1$.--.

Signed and Sealed this

Fourteenth Day of November 1978

[SEAL]

Attest:

RUTH C. MASON
Attesting Officer

DONALD W. BANNER
Commissioner of Patents and Trademarks